(12) United States Patent
de Waal et al.

(10) Patent No.: US 7,516,412 B1
(45) Date of Patent: Apr. 7, 2009

(54) METHOD AND APPARATUS FOR CONTENT-BASED RENDERING OF USER INTERFACES

(75) Inventors: Abraham B. de Waal, San Jose, CA (US); Kenneth L. Hurley, Los Altos, CA (US)

(73) Assignee: NVIDIA Corporation, Santa Clara, CA (US)

( * ) Notice: Subject to any disclaimer, the term of this patent is extended or adjusted under 35 U.S.C. 154(b) by 847 days.

(21) Appl. No.: 10/444,521

(22) Filed: May 23, 2003

(51) Int. Cl.
*G06F 3/00* (2006.01)
*G06F 17/00* (2006.01)

(52) U.S. Cl. .................. 715/760; 715/243; 715/273
(58) Field of Classification Search .......... 715/760, 715/517, 526, 243, 273
See application file for complete search history.

(56) References Cited

U.S. PATENT DOCUMENTS

| | | | | |
|---|---|---|---|---|
| 5,386,567 A * | 1/1995 | Lien et al. | ............ | 713/100 |
| 5,644,775 A * | 7/1997 | Thompson et al. | ............ | 704/7 |
| 5,673,401 A * | 9/1997 | Volk et al. | ............ | 725/139 |
| 6,023,714 A * | 2/2000 | Hill et al. | ............ | 715/513 |
| 6,226,642 B1 * | 5/2001 | Beranek et al. | ............ | 707/10 |
| 6,295,061 B1 * | 9/2001 | Park et al. | ............ | 715/764 |
| 6,342,907 B1 * | 1/2002 | Petty et al. | ............ | 715/762 |
| 6,476,828 B1 * | 11/2002 | Burkett et al. | ............ | 715/760 |
| 6,493,872 B1 * | 12/2002 | Rangan et al. | ............ | 725/32 |
| 6,546,419 B1 * | 4/2003 | Humpleman et al. | ............ | 709/223 |
| 6,941,521 B2 * | 9/2005 | Lin et al. | ............ | 715/762 |
| 6,968,538 B2 * | 11/2005 | Rust et al. | ............ | 717/108 |
| 6,980,987 B2 * | 12/2005 | Kaminer | ............ | 707/6 |
| 7,089,566 B1 * | 8/2006 | Johnson | ............ | 719/328 |
| 7,111,010 B2 * | 9/2006 | Chen | ............ | 707/102 |
| 7,120,897 B2 * | 10/2006 | Ebbo et al. | ............ | 717/108 |
| 2004/0003067 A1 * | 1/2004 | Ferrin | ............ | 709/223 |
| 2004/0090648 A1 * | 5/2004 | Green et al. | ............ | 358/1.15 |
| 2004/0176967 A1 * | 9/2004 | Whittenberger | ............ | 705/1 |
| 2005/0223100 A1 * | 10/2005 | Chen et al. | ............ | 709/228 |
| 2005/0273460 A1 * | 12/2005 | Abrams et al. | ............ | 707/2 |

OTHER PUBLICATIONS

Joshua Lubell Structured markup on the web: A tale of two sites Markup Languages: Theory & Practice 1.3 (1999) 7-22.*
Paul DiLascia Q&A C++ Microsoft Systems Journal Nov. 1999.*
Jeffrey Nichols, Brad Myers, Michael Higgins, Joseph Hughes, Thomas Harris, Roni Rosenfeld, Mathilde Pignol Generating Remote Control Interfaces for Complex Appliances UIST'02 Oct. 27-30, 2002 vol. 4 Issue 2 pp. 161-170.*
www.osronline.com/ddkx/kmarch/plugplay_29ev.htm Device Tree.*
Suzuki, T. Fujii, T. Yokota, K. Asama, H. Kaetsu, H. Endo, I. Teleoperation of multiple robots through the Internet Robot and Human Communication, 1996., 5th IEEE Internation Workshop p. 84-89.*

* cited by examiner

*Primary Examiner*—Rachna S Desai
*Assistant Examiner*—Andrea N Long
(74) *Attorney, Agent, or Firm*—Patterson & Sheridan, LLP

(57) ABSTRACT

Method and apparatus for content based dynamic rendering of user interfaces. The present invention provides a system that receives an unformatted stream of content, and then considers the physical dimensions of its controlled screen area and dynamically lays out the content to fit in this screen area.

6 Claims, 9 Drawing Sheets

METHOD AND APPARATUS FOR CONTENT-BASED RENDERING OF USER INTERFACES

The present invention relates to a novel method and apparatus for content based dynamic rendering of user interfaces. More specifically, the present invention provides a system that receives an unformatted stream of content, and then considers the physical dimensions of its controlled screen area and dynamically lays out the content to fit in this screen area.

BACKGROUND OF THE DISCLOSURE

User interfaces such as software control panels have been deployed in various software applications. These control panels are deployed to allow a user to change the appearance and functionality of an application.

Unfortunately, traditional control panels are static, i.e., they are not dynamically updated. For example, a traditional control panel will simply ask a control driver as to what is available, i.e., it does not allow data to be changed.

Therefore, a need exists for a novel method and apparatus for dynamically configuring a control panel.

SUMMARY OF THE INVENTION

In one embodiment of the present invention, a novel method and apparatus for dynamically configuring a control panel is disclosed. Specifically, the present invention describes a system that receives an unformatted stream of content describing the test, user interface controls (e.g., edit boxes, list boxes, etc.), locale and customizations. A dynamic renderer considers the physical dimensions of its controlled screen area and dynamically lays out the content to fit in this screen area.

The present invention provides several advantages. First, this dynamic approach addresses localization issues, e.g., where a content provider only provides English content and a translate engine is subsequently needed to translate the English content into a proper foreign language. Using the present invention, localization issues such as right-to-left text and glyph size can be dynamically addressed. Namely, the present invention allows customization downstream from the content provider.

Second, the present invention allows a server to dynamically interact with the user interface.

Third, the present invention allows for remote administration of control panel settings. Namely, an administrator is allowed to globally set users setting for display management.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one embodiment of the present invention, a control panel is disclosed that is extensible. Specifically, the control panel presents a consistent look and feel by embedding COM controls within dynamically generated XML, which is rendered within a web browser control. It includes instrumentation for web-enabled administration (WMI). The panel also allows for OEM customization.

Figure 1:
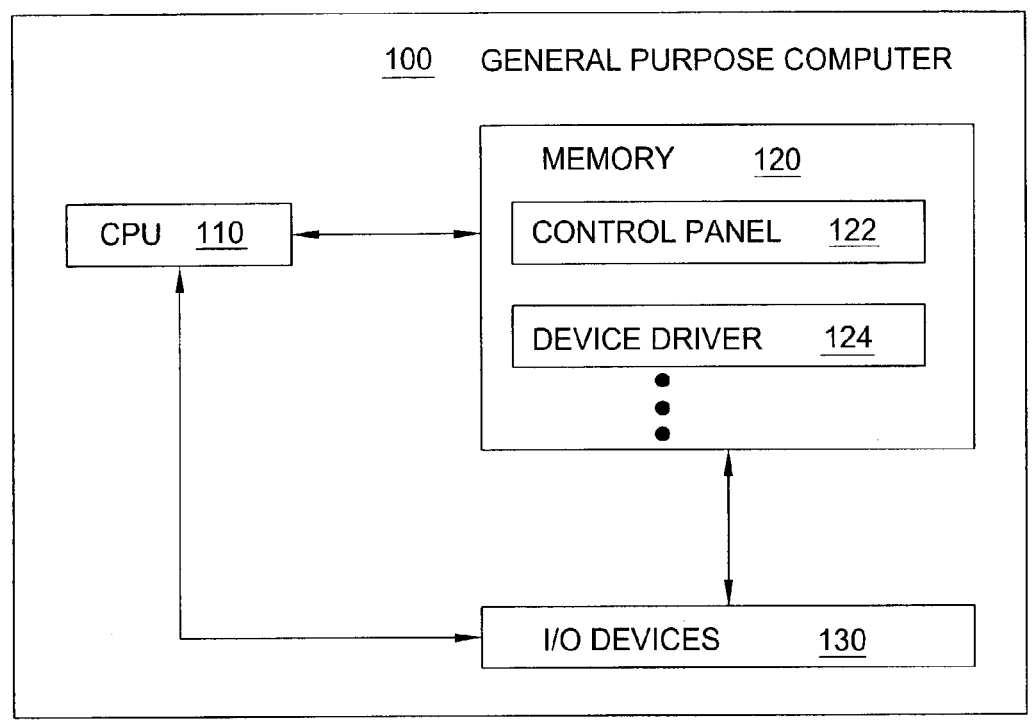
FIG. 1 illustrates a block diagram of a general purpose computer system implementing the present invention.

FIG. 1 illustrates a block diagram of a general purpose computer system 100 implementing the present invention. The computer system 100 comprises a central processing unit (CPU) 110, a system memory 120, and a plurality of Input/Output (I/O) devices 130.

In one embodiment, a novel control panel 122, a plurality of device drivers 124 and other software modules are loaded into the memory 120 and are operated by the CPU 110. Alternatively, the various software modules (or parts thereof) within the memory 120 can be implemented as physical devices or even a combination of software and hardware, e.g., using application specific integrated circuits (ASIC), where the software is loaded from a storage medium, (e.g., a magnetic or optical drive or diskette) and operated by the CPU in the memory 120 of the computer. As such, the control panel 122, device drivers 124 and other software modules as disclosed below or parts thereof (including associated data structures) of the present invention can be stored on a computer readable medium, e.g., RAM memory, magnetic or optical drive or diskette and the like.

The I/O devices include, but are not limited to, a keyboard, a mouse, a display, a storage device (e.g., disk drive, optical drive and so on), a scanner, a printer, a network interface, a modem, a graphics subsystem, a transmitter, a receiver and the like. It should be noted that various controllers, bus bridges, and interfaces (e.g., memory and I/O controller, I/O bus, AGP bus bridge, PCI bus bridge and so on) are not specifically shown in FIG. 1. However, those skilled in the art will realize that various interfaces are deployed within the computer system 100, e.g., an AGP bus bridge can be deployed to interface a graphics subsystem to a system bus and so on. It should be noted that the present invention is not limited to a particular bus or system architecture.

Figure 2:
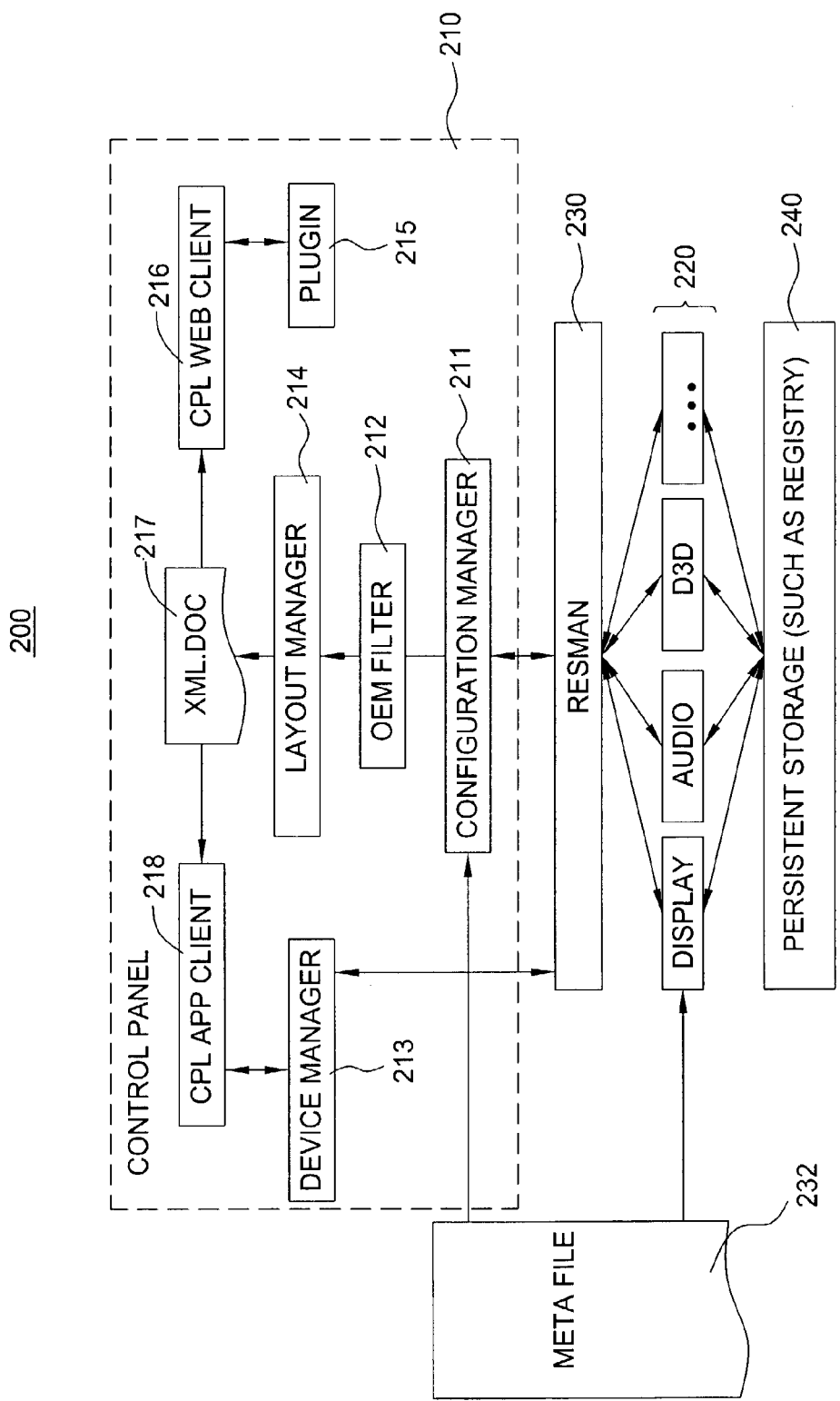
FIG. 2 illustrates a high-level system architecture of the present invention.

FIG. 2 illustrates a high-level system architecture 200 of the present invention. Specifically, the system comprises a control panel 210, a plurality of driver modules 220, a software bridge (resource manager) 230, and a storage 240.

In operation, the control panel 210 is designed so that there is one central location for information to be passed between a configuration client and all the driver modules. Each driver module 220 is responsible for its own configuration options and the persistent storage of those options in storage 240. The resource manager module (Resman) is the software bridge between the drivers 220 and the configuration manager module 211. It produces the metadata 232, which is streamed to the user-mode layout manager module 214. The layout manager 214 is responsible for parsing the metadata and producing an XML (Extensible Markup Language) document 217. This XML 217 is rendered by a browser control modules 216 and/or 218, which is instantiated and controlled by the layout manager 214.

It should be noted that although the present invention is disclosed using XML documents, the present invention is not so limited. Namely, other document formats that broadly allow data to be wrapped in tags can be adapted to be used with the present invention. Thus, documents that are "XML-like" or "markup language" documents can be adapted with the present invention.

It should be noted that several "offline" processes can be deployed prior to the activation of the present invention. Namely, metadata can be generated offline.

Figure 5:
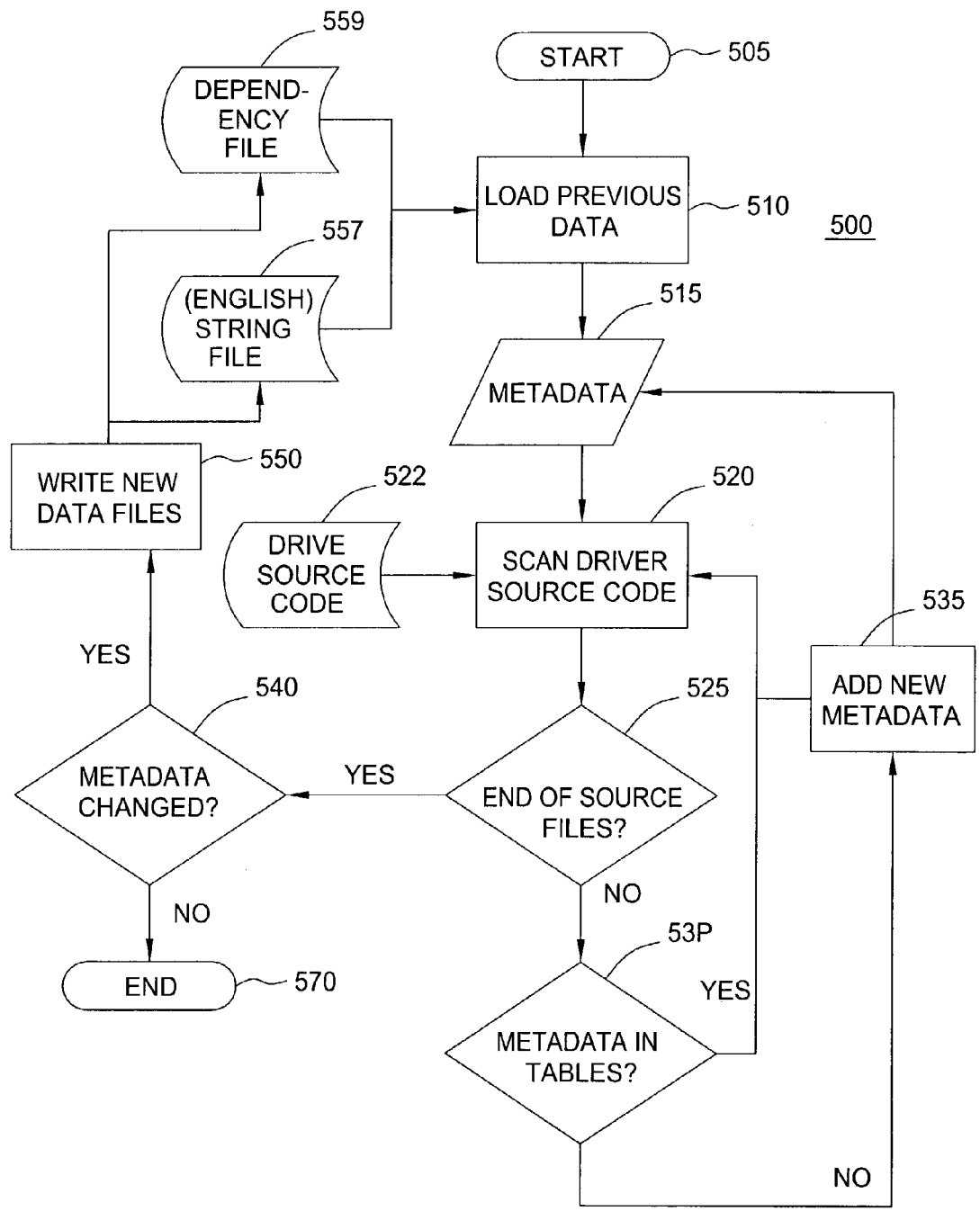
FIG. 5 illustrates a flowchart of a method for handling metadata of the present invention.

FIG. 5 illustrates a flowchart of a method 500 for handling metadata of the present invention. Method 500 starts in step 505 and proceeds to step 510.

In step 510, method 500 loads previous data. For example, method 500 may load a dependency file 559 and/or a string file, e.g., English string file 557. Information pertaining to the dependency and string is generated in the form of a metadata table 515 that will be passed back and forth between the control panel 210 and the driver modules 220.

In step 520, method 500 scans the driver source code 522 of one or more drivers, e.g., device drivers. Effectively, it allows each driver module to determine what will go into the control panel 210, i.e., each driver module contains information that can dynamically affects the layout.

In step 525, method 500 queries whether the scanning process has reached the end of all the source files. If the query is affirmatively answered, then method 500 proceeds to step 540. If the query is negatively answered, then method proceeds to step 530.

In step 530, method 500 queries whether the "scanned" metadata is in a current table. If the query is affirmatively answered, then method 500 proceeds back to step 520, where the scanning process continues for additional metadata. If the query is negatively answered, then method 500 proceeds to step 535, where newly scanned metadata is added to the metadata table 515 and the method 500 returns to step 520.

In step 540, method 500 queries whether the metadata has changed. If the query is affirmatively answered, then method 500 proceeds to step 550 where new data files are created, e.g., creating new dependency file 559 and new string file 557. If the query is negatively answered, then method 500 ends in step 570.

Figure 6:
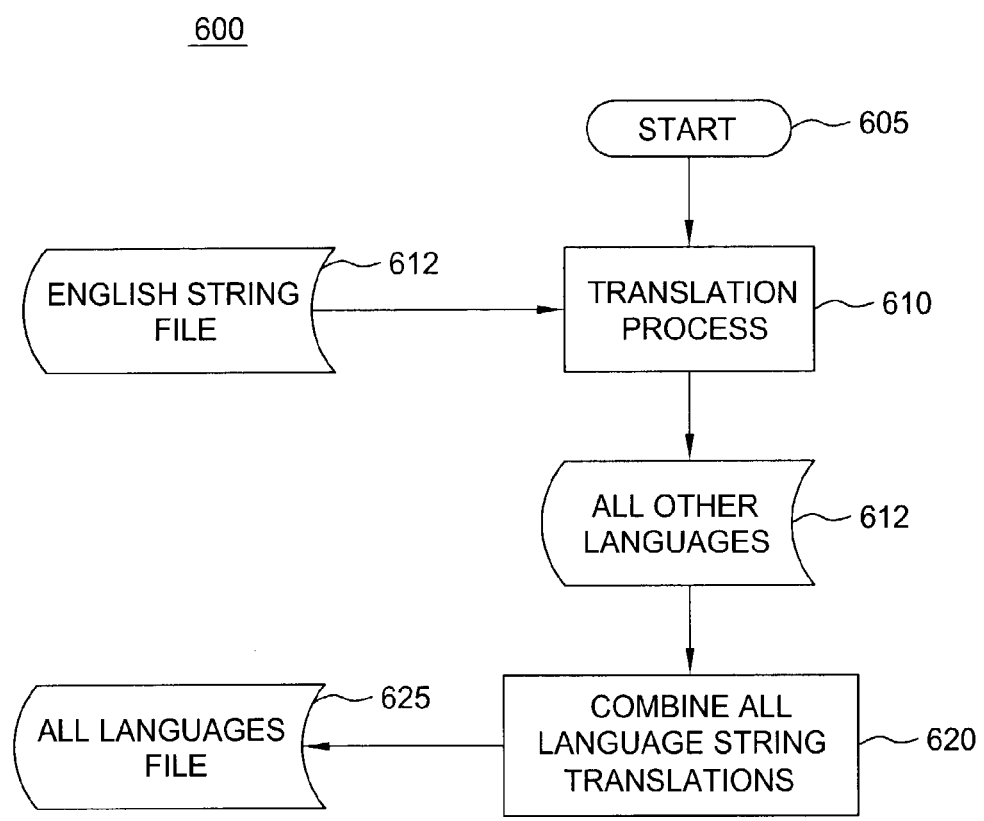
FIG. 6 illustrates a flowchart of a method for translating content in English into other languages.

FIG. 6 illustrates a flowchart of a method 600 for translating content in English into other languages. Again, method 600 can be implemented as an offline process. Method 600 starts in step 605 and proceeds to step 610.

In step 610, the string file 612 as created from method 500 can be translated. For example, the string file contains content this is in English. This English content is translated into a desired foreign language 612.

In step 620, method 600 combines all language string translations and stores them into an all language file 625. This all language file 625 can be used when the control panel is activated as discussed below.

Figure 7:
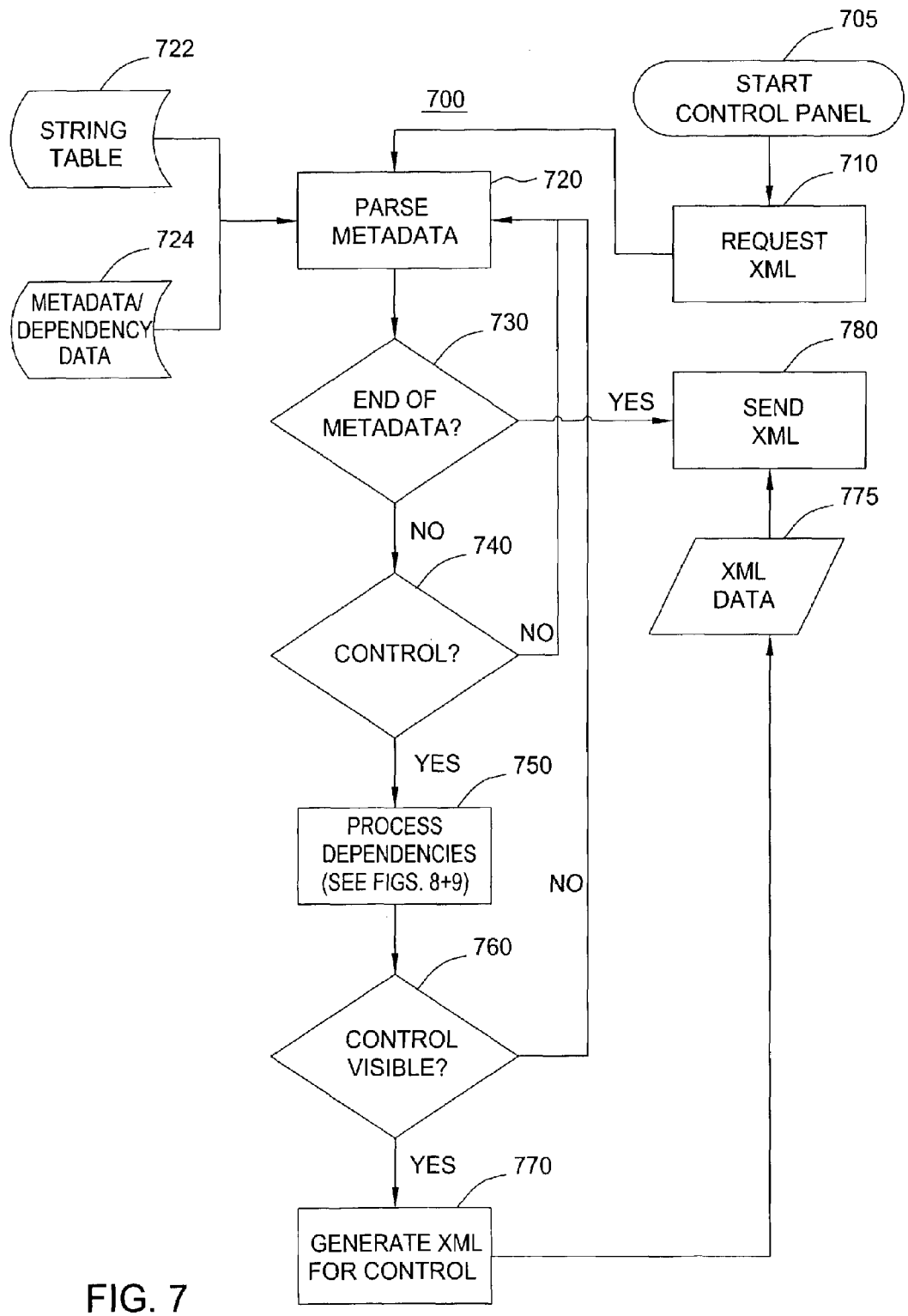
FIG. 7 illustrates a flowchart of a method for operating a control panel of the present invention.

To better understand the present invention, an operational sequence is now described with respect to FIG. 2. and FIG. 7. Specifically, the following describes the events from the moment that the user invokes the control panel, whether it is via the desktop or the web, to when all of the display configuration is presented and available for change.

FIG. 7 illustrates a flowchart of a method 700 for operating a control panel of the present invention. Method 700 starts the control panel in step 705. Namely, a user clicks on a desktop to invoke the control panel.

In step 710, a request is made for display information. In one embodiment, method 700 requests an XML document. Effectively, a control panel applet invokes the configuration manager module 211 to open a connection to resource manager module 230. In turn, configuration manager module 211 sends a general device state query to the resource manager module 230.

In step 720, method 700 parses the metadata. Namely, the resource manager module 230 builds a metadata model of the system profile and it is stored in a Metadata files 722 and 724. This is filled with data from the registry as well as physically present and available system resources. All persistent configuration settings are maintained by the resource manager module 230. The resource manager module 230 then replies to the query with this stream of metadata, where the format of this metadata is described below. The configuration manager module 211 invokes the layout manager module 214 with this metadata, unchanged. Thus, the layout manager module 214 parses the metadata and builds a device state tree in memory. Display properties main information (e.g., GPU, etc.) will be the root of this tree. Primary categories will be the first branches from the root. These branches are specified within the metadata.

In step 730, method 700 queries whether it has reached the end of the metadata. If the query is positively answered, then method 700 proceeds to step 780, where an XML document is generated and sent, e.g., to a browser control. If the query is negatively answered, then method 700 proceeds to step 740.

In step 740, method 700 queries whether there is control in the metadata. If the query is negatively answered, then method 700 returns to step 720. If the query is positively answered, then method 700 proceeds to step 750.

Figure 8:
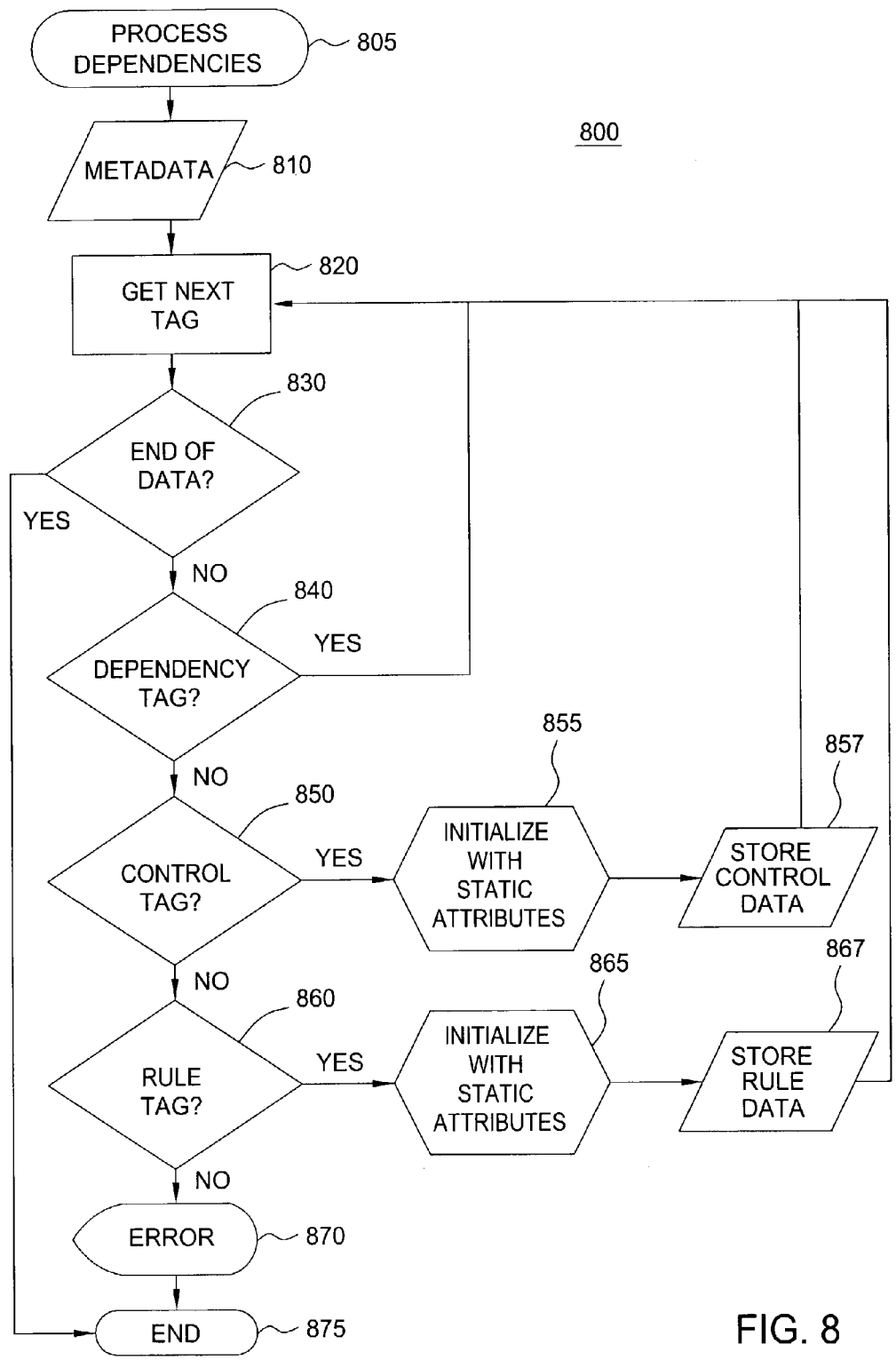
FIG. 8 illustrates a flowchart of a method for handling dependencies of the present invention.
Figure 9:
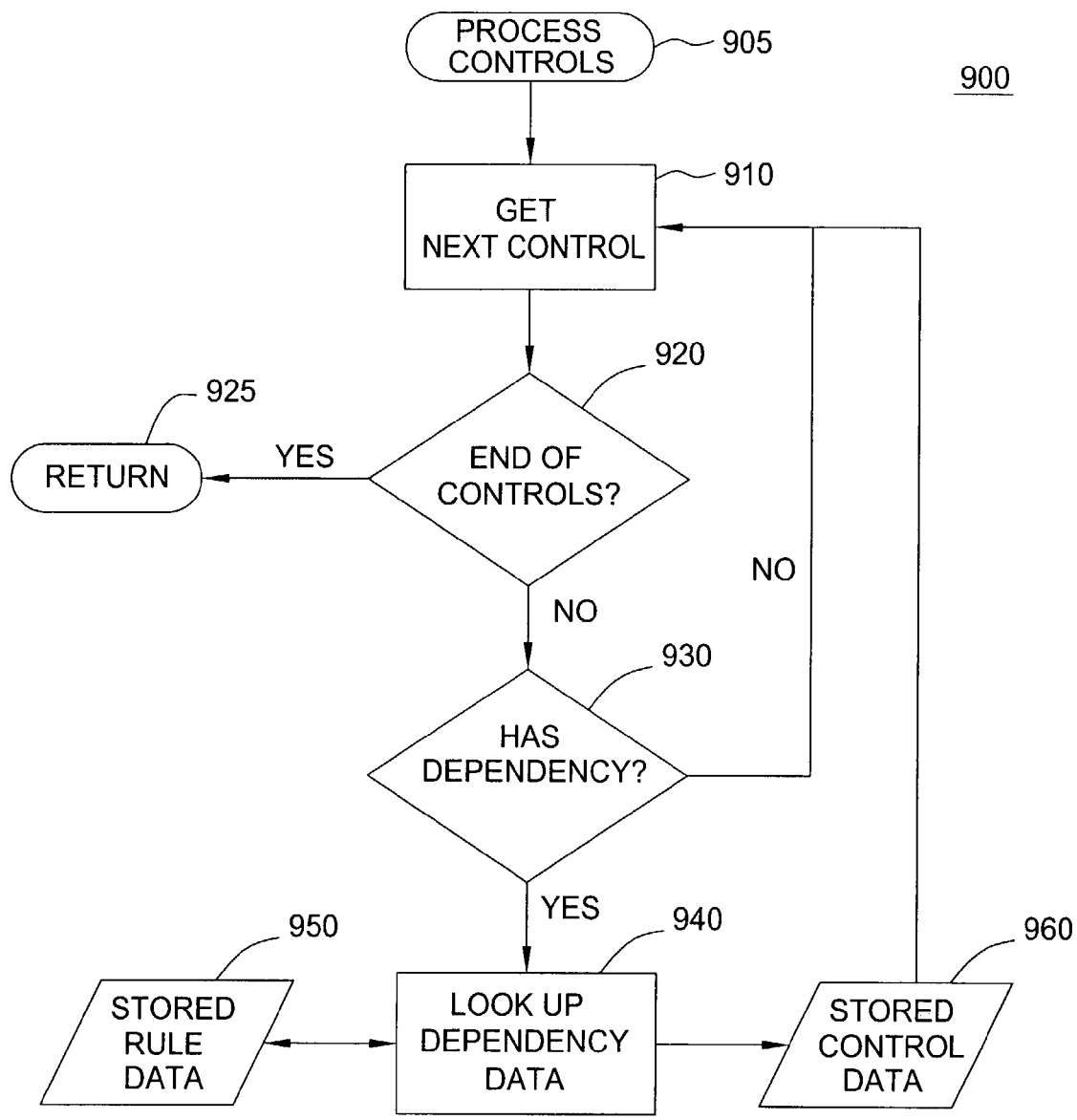
FIG. 9 illustrates a flowchart of an alternate method for handling dependencies of the present invention.

In step 750, method 700 processes dependencies associated with the control. Dependency processing is illustrated in FIGS. 8 and 9 below.

In step 760, method 700 queries whether the control affects visibility. If the query is negatively answered, then method 700 returns to step 720. If the query is positively answered, then method 700 proceeds to step 770.

In step 770, method 700 generates an XML for the control, i.e., the XML data 775 is sent to a browser control in step 780. More specifically, the layout manager module 214 instantiates a browser, e.g., Internet Explorer (IE), shell COM container as the presentation manager module or an XML renderer. Thus, in one embodiment, the XML renderer is an Internet Explorer COM container. It is capable of accepting a stream of XML with embedded ActiveX controls and rendering it. It maintains no state information.

The layout manager module 214 populates the browser container with custom controls, e.g., ActiveX controls, embedded within an XML document. The format of the XML document may be modified by an optional OEM custom filter 212. The ActiveX controls represent each atomic category of metadata. No state is maintained by the browser container. All changes by the user within the ActiveX controls are maintained within the device state tree. The visual display of the data is simply the COM in-site active rendering of the controls.

It should be noted that the user can scroll through the categories and controls, expanding and collapsing nodes. Each control does its custom rendering as it is set active.

For example, if the user changes some settings, then the device state tree is marked as dirty. If the user cancels the change, then the device state tree is changed back and marked as clean.

Alternatively, if the user changes some settings, then the device state tree is marked as dirty. However, if the user applies the change, then the device state tree is told to commit. The layout manager module 214 passes the changed subset of metadata to the configuration manager module 211. The configuration manager module 211 passes this subset to the resource manager module 230. The resource manager module 230 parses this metadata and registers it on the hardware.

Finally, the user closes the control panel. The layout manager module 214 deletes the device state tree from memory. The layout manager module closes and the configuration manager closes its connection to resource manager module 230.

The layout manager module 214 is tasked with parsing and displaying the metadata. It is also binds the ActiveX controls to the metadata and maintains the device state tree. It is responsible for generating the XML with embedded ActiveX controls in an intuitive manner.

Figure 3:
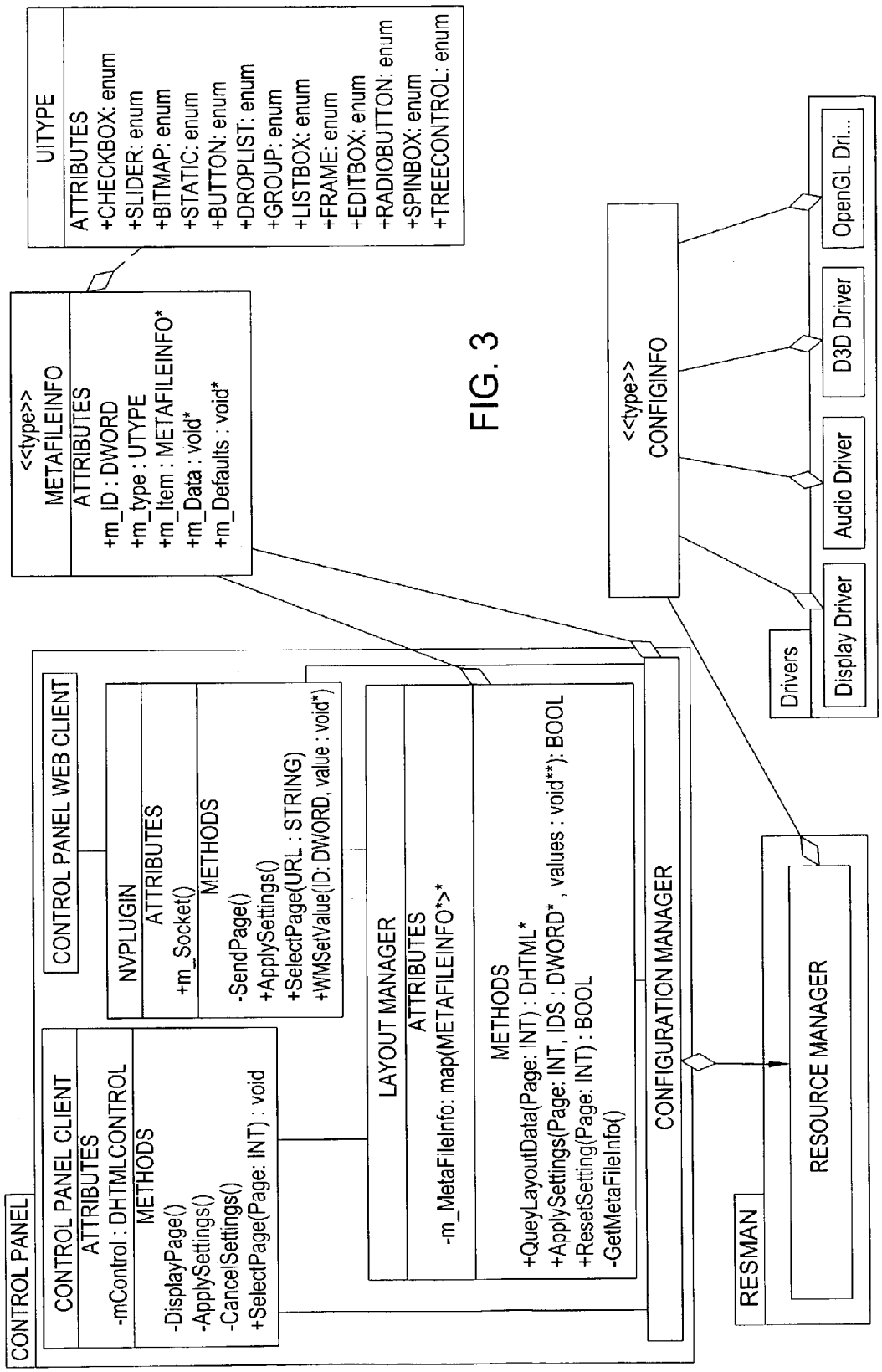
FIG. 3 illustrates a diagram of how the layout manager module of the present invention interfaces with client applications.

Importantly, the layout manager module 214 invokes the XML renderer as disclosed above. The "GetMetaDataInfo" function is a private function that retrieves the metadata information from the configuration manager module in order to build the layout. FIG. 3 illustrates a UML diagram of how the layout manager module interfaces with the client applications.

Figure 4:
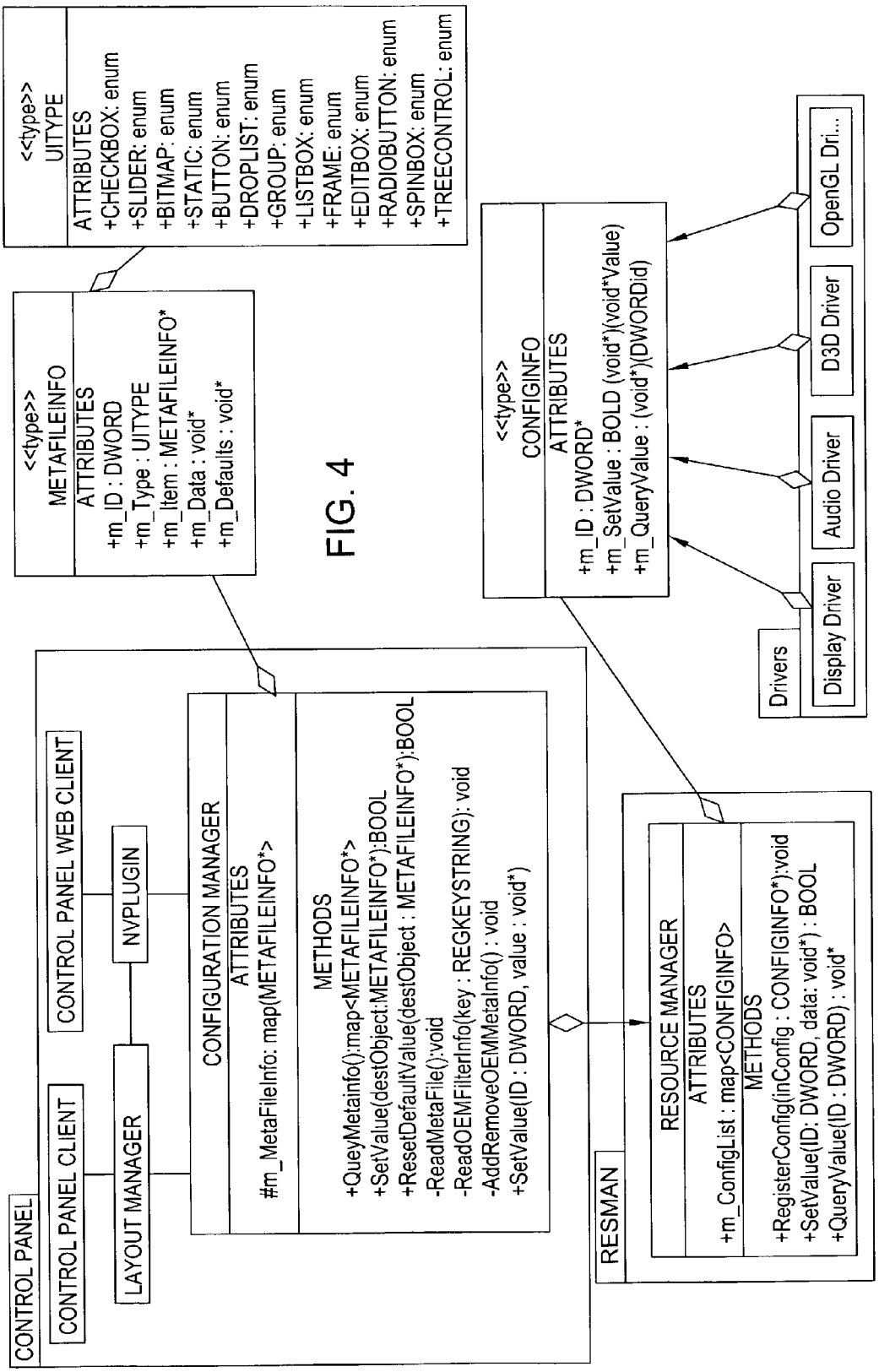
FIG. 4 illustrates a diagram of how the configuration manager module of the present invention interfaces with other components of the overall system.

The configuration manager module 211 (configman) is the user mode component which opens the connection with the resource manager module 230 and invokes the layout manager module 214. Namely, the configuration manager module 211 starts the execution. It is responsible for handling the metadata information that is pushed up from the resource manager module 230. It has one attribute, a standard template library map container which functions as a hash table. FIG. 4 illustrates a diagram of how the configuration manager module 211 interfaces with other components of the overall system.

The resource manager module 230 provides several features. In addition to performing its resource management functions, the resource manager module 230 will be able to present a single point of retrieval for metadata. To accomplish this feature, it is able to enumerate all system resources and settings, and then to build the metadata from this information. The resource manager module 230 is able to accept parts of metadata from user-mode, to parse it, and to register the changes on the hardware. Thus, resource manager module 230 performs several novel functions: 1) enumerate system resources and persistent settings; 2) build single metadata stream from system state; 3) accept and parse metadata from user-mode client; and 4) register to hardware configuration changes described in metadata.

In one embodiment, each atomic metadata category will be presented by a control, e.g., an ActiveX control. That is, the display of information and the retrieval of user selection criteria will be handled within each control. The data is bound via the layout manager module to the metadata. The ActiveX controls will represent each of the user interface types (e.g., group box with radio controls, list box, etc.). Some ActiveX controls will be aggregated to join related user interface components. Thus, ActiveX controls may represent atomic user interface categories, may be combined through aggregation, and be in-sync with device state tree and metadata.

The present invention discloses and employs several data structures. These data structures include meta file information (METAFILEINFO) structure and the configuration information (CONFIGINFO) structure.

The METAFILEINFO structure is used as a container for the information that is passed between the layout manager module 214 and the configuration manager module 211. It is also used to store data that has been retrieved from the metadata stream. The m_ID component is a DWORD and contains the ID associated with the information. The m_Type member is used to identify what type of user interface (UI) element is to be associated with the configuration component. This is used in the layout engine to determine what kind of element to draw. The enumerants for this member is listed in the class diagram in FIGS. 3 and 4. The m_Items member is used to access children of this parent. This is useful for connecting GUI elements together. The m_Data member is a void pointer and is dependent on the m_Type member. Each type will have a structure that defines this data.

The CONFIGINFO structure is used when a driver is loaded into the system. The driver calls the resource manager to register itself. Each driver passes in the structure so that when configuration changes, the resource manager module 230 will callback into the driver to have the configuration set. The m_ID member is used in communicating which attributes are part of the driver. The m_SetValue is a pointer to a function that takes an ID and a void * to the data. This function returns a BOOL if there was an error. The m_GetValue member is a pointer to a function that takes an ID. It returns a void * that is the data associated with the enumeration listed in UITYPE. Each UITYPE has a structure that is unique to its requirements.

The metadata represents the current system state mapped with the capabilities of the system. Below is an example of the .h file that would exist in the driver source tree:

```
#define BASE_ID                        0x0
#define ID_FUNC_GETCARDTYPE            MAKE_ID(BASE_ID, 0)
#define BASE_D3D_ID                    0x02
#define D3D_AA_MODE                    MAKE ID(BASE_D3D_ID, 0)
#define D3D_TEXEL_CENTER               MAKE ID(BASE_D3D_ID, 1)
#define D3D_REFRESH_OVERRIDE           MAKE ID(BASE_D3D_ID, 2)
#define ID_FUNC_GETAAMODE              MAKE ID(BASE_D3D_ID, 3)
#include <metadata.h>
// include metadata scanner generated strings
#include <metastrID.h>
#if 0
#METADATA-STRING D3D_AA_MODE_STR_NONE    "None"
#METADATA-STRING D3D_AA_MODE_STR_2X      "2x"
#METADATA-STRING D3D_AA_MODE_STR_3X      "3x"
#METADATA-STRING D3D_AA_MODE_STR_4X      "4x"
#METADATA-STRING D3D_AA_MODE_STR_QC      "QuinCunx"
#METADATA-STRING D3D_RES_320X200         "320x200"
#METADATA-STRING D3D_RES_640X480         "640x480"
#METADATA-STRING D3D_RES_1024X768        "1024x768"
#METADATA-STRING D3D_RES_1280X1024       "1280x1024"
#endif
```

Metadata.h contains definitions of the different metadata types. The "id" portion of the METADATA structure is used in communicating to the driver which page (i.e., which component) the message is to be sent to. For example, when the user clicks on a radio button, the configuration manager sends the message SELECTION, with the id D3D_AA_MODE and the id that is contained in the RADIOBUTTON structure. An example of what would be contained in metadata.h

```
#define        ID_GROUP              1
#define        ID_RADIO_BUTTON       2
#define        ID_LIST_BOX           3
```

The metastrID.h file is generated before compiling any other file. It is generated by a program that scans the .h files and creates the string IDs for the resource file as well as the modules. The string IDs are prepended with "IDS_". These are the IDs that are used in the code. Contents of metastrID.h would be similar to this.

```
#define    IDS_D3D_AA_MODE_STR_NONE    25000
#define    IDS_D3D_AA_MODE_STR_2X      25001
#define    IDS_D3D_AA_MODE_STR_3X      25002
#define    IDS_D3D_AA_MODE_STR_4X      25003
#define    IDS_D3D_AA_MODE_STR_QC      25004
#define    IDS_D3D_RES_320X200         25005
#define    IDS_D3D_RES_640X480         25006
#define    IDS_D3D_RES_1024X768        25007
#define    IDS_D3D_RES_1280X1024       25008
```

The scanner program would also generate a file called Str_EN.h which would look like the following

```
#define    D3D_AA_MODE_STR_NONE    "None"
#define    D3D_AA_MODE_STR_2X      "2x"
#define    D3D_AA_MODE_STR_3X      "3x"
#define    D3D_AA_MODE_STR_4X      "4x"
#define    D3D_AA_MODE_STR_QC      "QuinCunx"
#define    D3D_RES_320X200         "320x200"
#define    D3D_RES_640X480         "640x480"
#define    D3D_RES_1024X768        "1024x768"
#define    D3D_RES_1280X1024       "1280x1024"
```

Additionally, the nvCpl.rc file will include a file called Strings.h which would look like this:
include "metastrID.h"
// localized version include
include "str_EN.h"

```
STRINGTABLE DISCARDABLE
BEGIN
    IDS_D3D_AA_MODE_STR_       D3D_AA_MODE_STR_
    NONE                       NONE
    IDS_D3D_AA_MODE_STR_2X     D3D_AA_MODE_STR_2X
    IDS_D3D_AA_MODE_STR_3X     D3D_AA_MODE_STR_3X
    IDS_D3D_AA_MODE_STR_4X     D3D_AA_MODE_STR_4X
    IDS_D3D_AA_MODE_STR_QC     D3D_AA_MODE_STR_QC
    IDS_D3D_RES_320X200        D3D_RES_320X200
    IDS_D3D_RES_640X480        D3D_RES_640X480
    IDS_D3D_RES_1024X768       D3D_RES_1024X768
    IDS_D3D_RES_1280X1024      D3D_RES_1280X1024
END
```

FIG. 8 illustrates a flowchart of a method 800 for handling dependencies of the present invention. Method 800 starts in step 805 and proceeds to step 820 where method 800 gets a next tag within a metadata file 810.

In step 830, method 800 queries whether it has reached the end of the data. If the query is affirmatively answered, method 800 ends in step 875. If the query is negatively answered, method 800 proceeds to step 840.

In step 840, method 800 queries whether a tag is a dependency tag. If the query is affirmatively answered, method 800 returns to step 820. If the query is negatively answered, method 800 proceeds to step 850.

In step 850, method 800 queries whether a tag is a control tag. If the query is affirmatively answered, method 800 proceeds to step 855, where the control tag is initialized with static attributes and the control data is stored in step 857. If the query is negatively answered, method 800 proceeds to step 860.

In step 860, method 800 queries whether a tag is a rule tag. If the query is affirmatively answered, method 800 proceeds to step 865, where the rule tag is initialized with static attributes and the rule data is stored in step 867. If the query is negatively answered, method 800 proceeds to step 870.

In step 870, method 800 checks for errors and then ends in step 875.

FIG. 9 illustrates a flowchart of an alternate method 900 for handling dependencies of the present invention. Method 900 starts in step 905 and proceeds to step 910, where method 900 gets a next control.

In step 920, method 900 queries whether it has reached the end of the controls. If the query is affirmatively answered, method 900 returns in step 925. If the query is negatively answered, method 900 proceeds to step 930.

In step 930, method 900 queries whether a control has dependency. If the query is negatively answered, method 900 returns to step 910 to get the next control. If the query is positively answered, method 900 proceeds to step 940.

In step 940, method 900 looks up dependency data from a table, where the rule data and control data are then stored respectively in step 950 and step 960. Method 900 then returns to step 910 to get the next control.

Dependency data is incorporated in the METADATA and is in the form of XML. The code that handles the dependency and rule processing shall at a minimum recognize the following tags:
 dependency—Start of dependency list
 page—The page in which to add the dependencies/controls
 control—A visible control that is associated with the OLE object
  id—control's ID as defined above
  type—one of the recognizable types discussed below
  rule—a generic rule that helps decide functionality for the OLE object Namely, there are three types of tags: dependency, control and rule (with sub-parameters for each tag illustrated above using indentation).

Additional, several dependency sizes can be implemented with the present invention. Specifically, dependency sizes recognized by the XML processor are:
 int—standard integer
 string—a single string
 stringlist—a list of strings
 structure—any structure containing the above recognized types
 functions—denoted by functions Dependency lists can also use very basic operators. These operators are: +, −, *, /
 "$\sqrt[3]{}$" indicates a bitwise OR operation
 "&" indicates a bitwise AND operation
 "||" indicates a logical OR operation
 "&&" indicates a logical AND operation Dependency types are predefined types that are used to associate the OLE controls with the control (e.g. ID_RADIO_BUTTON).

Below is an illustrative set of pseudo codes representative of a dependency sample.
 <dependency page="Direct3D">
  <control    id="ID_ENABLE_AA_MODES"
    type="ID_RADIO_BUTTON"
   size="int"
    choices="0,  1"  visible="card_type.supportsAA"
     value="0"
    sets="ID_FUNC_ENABLE_AA(value)" />

```
<control id="ID_AA_MODES" type="ID_LIST_BOX"
    size="string"
    choices="cardtype.aamodes"
        enable="ID_ENABLE_AA_MODES.value"
    value="CurrentAAMode.value"
        sets="ID_FUNC_AA_MODE(value)" />
<rule id="ID_GEFORCE4_MX440">
    <attribute name="aamodes" size="stringlist"
    choices="IDS_D3D_AA_MODE_STR_2X,
IDS_D3D_AA_MODE_STR_4" />
    <attribute name="supportsAA" size="int" value="1" />
</rule>
<rule id="ID_GEFORCE4_TI">
<attribute name="aamodes" size="stringlist" choices
    ="IDS_D3D_AA_MODE_STR_2X,
    IDS_D3D_AA_MODE_STR_4X
    IDS_D3D_AA_MODE_STR_8X,
        IDS_D3D_AA_MODE_STR_QC" />
    <attribute name="supportsAA" size="int" value="1" />
</rule>
<rule id="ID_TNT2">
    <attribute name="supportsAA" size="int" value="0" />
</rule>
<rule     name="card_type"         size="int"
value="ID_FUNC_GETCARDTYPE( )" />
    <rule    name="CurrentAAMode"    size="int"
value="ID_FUNC_GETAAMODE( )"
/>
</dependency>
```

The above code is XML based. The file starts off with the dependency tag, which has one attribute that informs the program which page, the controls will be on. The next two tags are "control" which informs the program that the next items are physical controls that go on the page. The first one is a radio button. It's size is sizeof(int) for it's internal storage value. Choices for the radio button are either ON=1 or OFF=0.

The rules tag is used to pass data back and forth. This data is determined either at compile time or runtime. Function calls into the driver are supported. The size defines the returned size from the driver, which can be a structure. Parameters are passed in as shown in the "control" tag.

Although various embodiments which incorporate the teachings of the present invention have been shown and described in detail herein, those skilled in the art can readily devise many other varied embodiments that still incorporate these teachings.

What is claimed is:

1. An apparatus for dynamically configuring a control panel on a display, said apparatus comprising:
    a resource manager comprising a software bridge for scanning a plurality of driver modules to obtain a dependency list defining one or more dependencies based on metadata accessible by the plurality of driver modules, wherein each of the plurality of driver modules is responsible for its own configuration and includes information that can dynamically affect the layout of the control panel on the display;
    a storage unit for storing the metadata accessible by all the driver modules; and
    a layout manager responsive to the resource manager and configured to process the metadata and said one or more dependencies to obtain one or more controls and one or more rule tags, the layout manager generating an Extensible Mark up Language (XML) file for said one or more controls and providing said XML file to a browser to configure the control panel by instantiating a browser shell by building a device state tree in memory to configure the control panel, wherein basic display properties of the control panel comprise the root of the device state tree, and primary categories of display properties are the branches defined by the driver modules, the layout manager being further responsive to a user changing any of the one or more controls to alter the metadata and to convey the altered metadata to the resource manager, which is configured to modify the metadata stored in the storage unit.

2. The apparatus of claim 1, wherein said resource manager further provides a string list having text information in the metadata.

3. The apparatus of claim 2, wherein the layout manager further comprises:
    means for translating said text information in English of said string list into a different language.

4. The apparatus of claim 1, wherein a format of said XML file is modified by a custom filter.

5. Apparatus as in claim 1, including means for querying whether one of the controls affects visibility, and if so then the XML file is prepared and rendered without storing state information.

6. Apparatus as claimed in claim 5, wherein the resource manager comprises a single point of retrieval for metadata used to define the XML file.

* * * * *